(12) United States Patent
Lu et al.

(10) Patent No.: US 9,252,989 B2
(45) Date of Patent: Feb. 2, 2016

(54) DATA-DEPENDENT EQUALIZER CIRCUIT

(71) Applicant: LSI Corporation, Milpitas, CA (US)

(72) Inventors: Jin Lu, Lafayette, CO (US); Shaohua Yang, San Jose, CA (US); Weijun Tan, Longmont, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 48 days.

(21) Appl. No.: 13/628,513

(22) Filed: Sep. 27, 2012

(65) Prior Publication Data

US 2014/0086298 A1    Mar. 27, 2014

(51) Int. Cl.
*H03D 1/00*  (2006.01)
*H04L 25/03*  (2006.01)

(52) U.S. Cl.
CPC .............................. *H04L 25/03038* (2013.01)

(58) Field of Classification Search
CPC .................. H04L 25/03057; G11B 20/10046; G11B 20/10037; H03M 13/41
USPC .......................... 375/341, 227, 350; 702/107
See application file for complete search history.

(56) References Cited

U.S. PATENT DOCUMENTS

| | | | |
|---|---|---|---|
| 6,501,610 B1 * | 12/2002 | Sugawara et al. | 360/65 |
| 2005/0169412 A1 * | 8/2005 | Yang et al. | 375/350 |
| 2006/0259263 A1 * | 11/2006 | Ashley et al. | 702/107 |
| 2008/0189532 A1 * | 8/2008 | Haratsch | H04L 25/03235 712/239 |
| 2009/0161747 A1 * | 6/2009 | Aziz et al. | 375/231 |
| 2009/0213923 A1 * | 8/2009 | Chen et al. | 375/233 |
| 2011/0164669 A1 * | 7/2011 | Mathew et al. | 375/227 |

* cited by examiner

*Primary Examiner* — Sam K Ahn
*Assistant Examiner* — Fabricio R Murillo Garcia

(57) ABSTRACT

A data dependent equalizer circuit includes a plurality of noise prediction filters. Respective ones of the noise prediction filters are configured to filter noise in sample data for at least one predetermined non-return to zero (NRZ) condition. A plurality of equalizers is communicatively coupled with the plurality of noise prediction filters. Respective ones of the plurality of equalizers are configured to yield equalized sample data that corresponds to the at least one predetermined NRZ condition for one or more of the noise prediction filters.

18 Claims, 9 Drawing Sheets

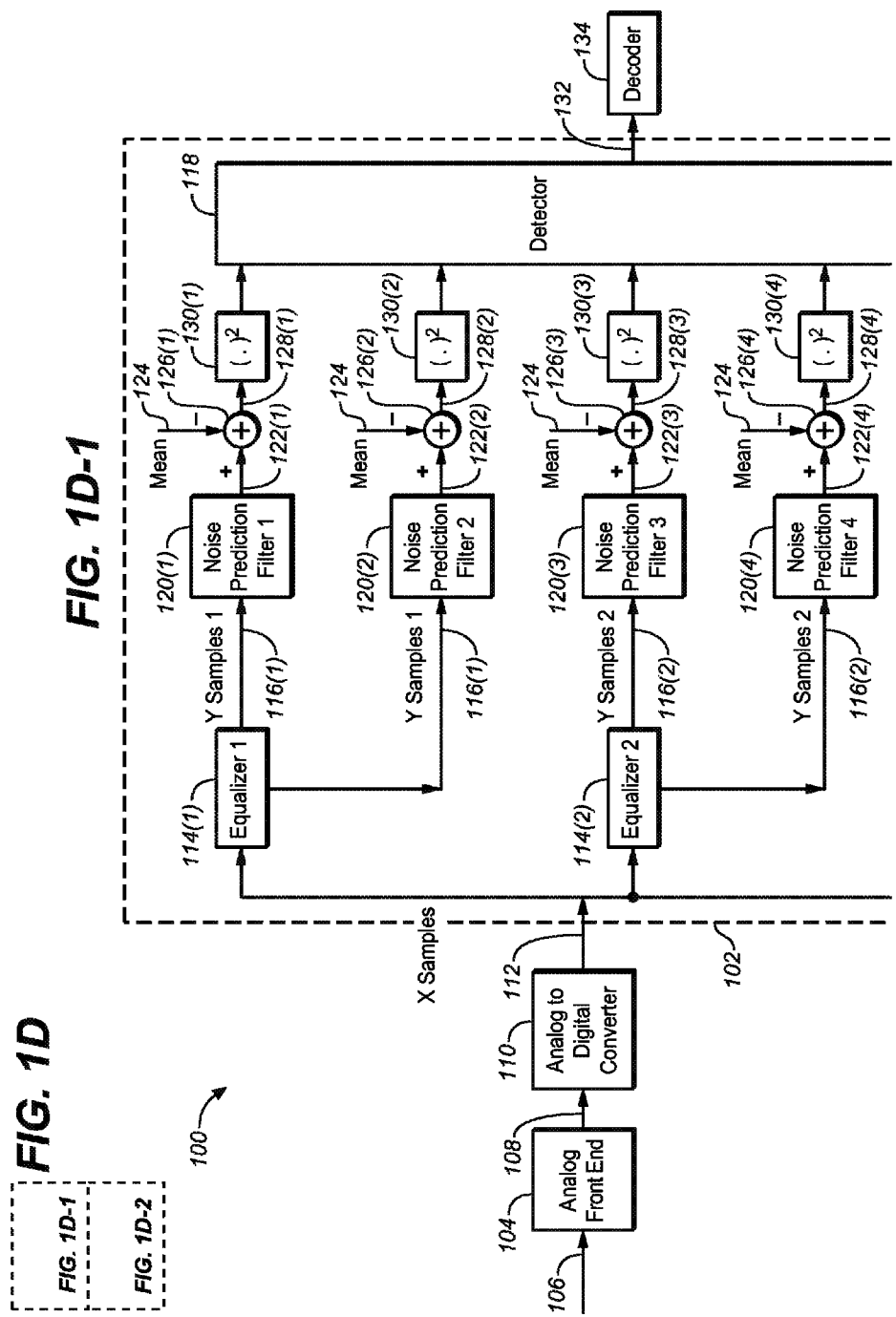

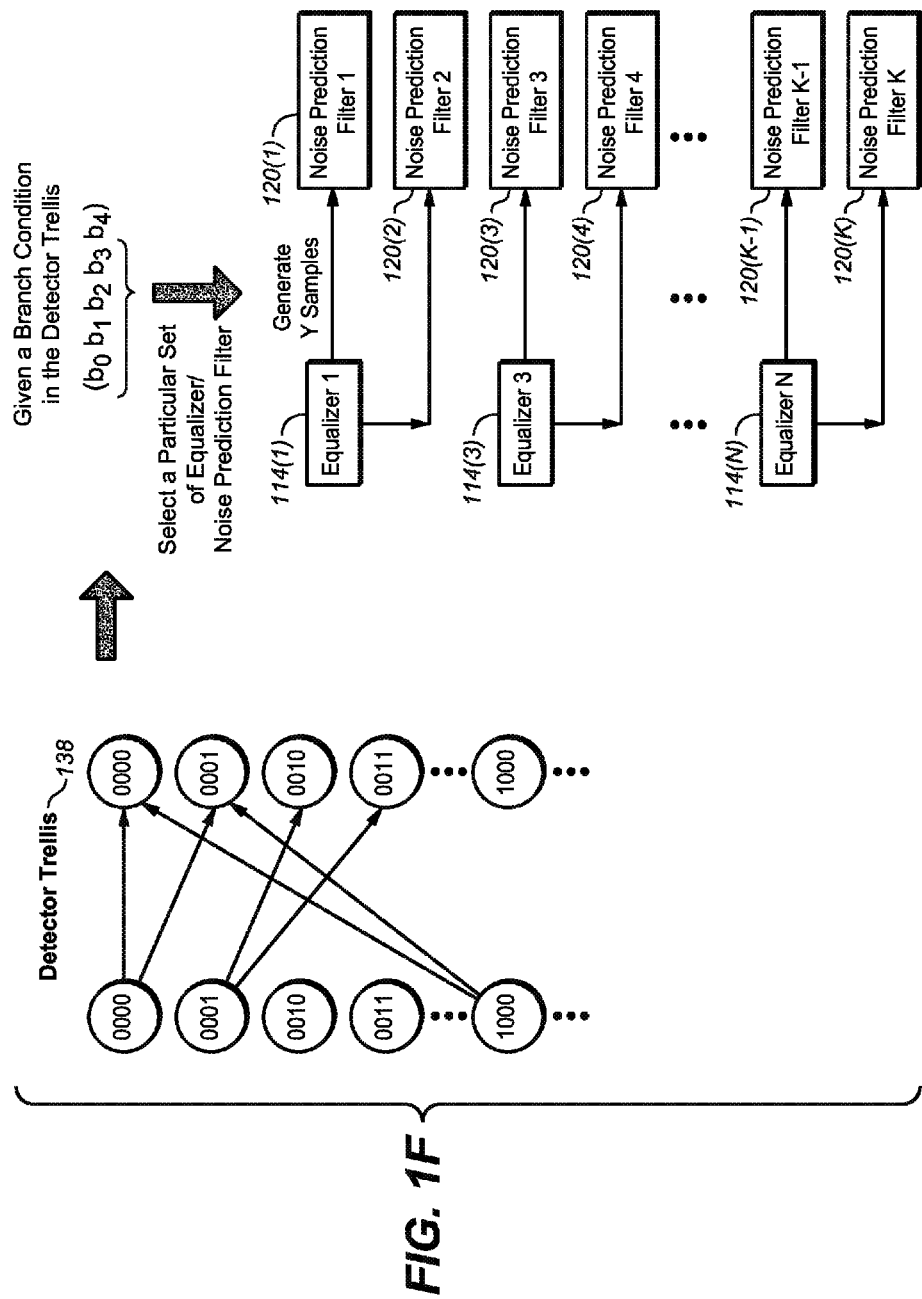

DATA-DEPENDENT EQUALIZER CIRCUIT

BACKGROUND

Various data processing systems have been developed including storage systems, cellular telephone systems, and radio transmission systems. In such systems, data is transferred from a sender to a receiver via a medium. For example, in a storage system, data is sent from a sender (e.g., a write function) to a receiver (e.g., a read function) via a storage medium. As information is stored and transmitted in the form of digital data, errors are introduced that, if not corrected, can corrupt the data and render the information unusable. The effectiveness of any transfer is impacted by any losses in data caused by various factors.

Consequently, error checking systems have been developed to detect and correct errors of digital data. Error checking systems are used, for example, to process data retrieved from a magnetic hard disk drive (HDD). Each data sector of the disk drive can have different noise, jitter, and distortion characteristics or signal to noise ratios (SNR), which can be due, for example, to magnetic media defects, off-track writing, high fly height of magnetic write heads during a writing operation, large phase disturbance, and so forth. The throughput of a HDD is affected by the number of read errors in a data sector, based in part on the SNR, and by the speed at which the read channel can recover from a read error by correcting the errors.

SUMMARY

A data-dependent equalizer circuit is disclosed. In one or more embodiments, the data dependent equalizer circuit includes a plurality of noise prediction filters. Respective ones of the noise prediction filters are configured to filter noise in sample data for at least one predetermined non-return to zero (NRZ) condition. A plurality of equalizers is communicatively coupled with the plurality of noise prediction filters. Respective ones of the plurality of equalizers are configured to yield equalized sample data that corresponds to the at least one predetermined non-return to zero (NRZ) condition for one or more of the noise prediction filters.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different instances in the description and the figures indicate similar or identical items.

FIG. 1F is a block diagram that illustrates selection of a noise prediction filter and a corresponding equalizer from a plurality of noise prediction filters and a plurality of equalizers, respectively, based on predetermined NRZ conditions.

DETAILED DESCRIPTION

Figure 1A:
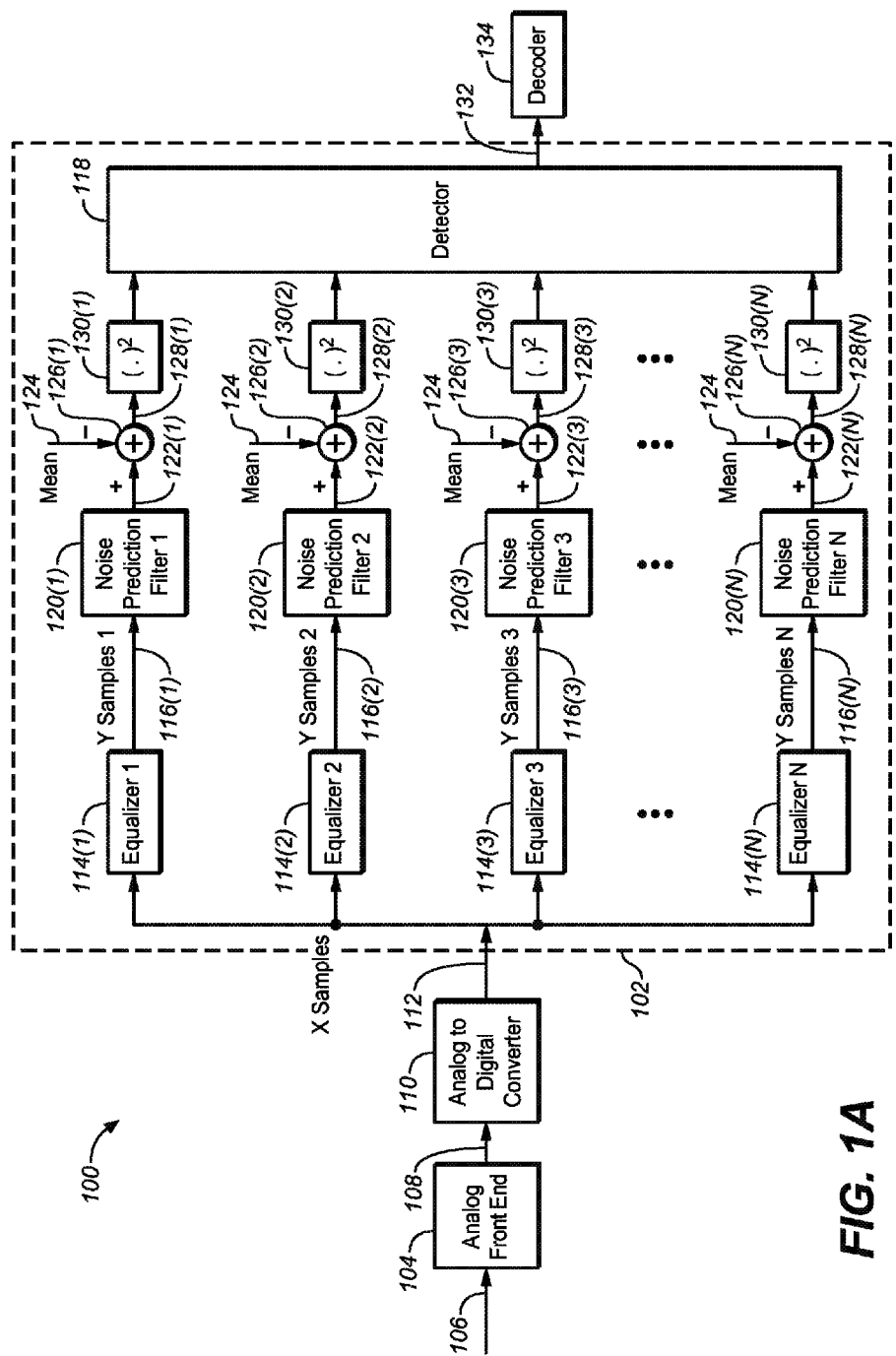
FIG. 1A is a block diagram that illustrates a data processing apparatus that employs a data-dependent equalizer circuit in accordance with an example embodiment of the disclosure.

FIGS. 1A through 1F illustrate data processing apparatus 100 that employ a data-dependent equalizer circuit 102 in accordance with embodiments of the disclosure. The data processing apparatus 100 include an analog front end 104 that receives and processes an analog signal 106 from a storage or transmission channel. In embodiments, the analog front end 104 includes, but is not necessarily limited to: an analog filter or an amplifier circuit. For example, in embodiments, the analog front end 104 includes a high pass filter, a variable gain amplifier (VGA), a compensation circuit for the magneto-resistive asymmetry (MRA) characteristic of a magnetic write head, and so forth. In some embodiments, the gain of a variable gain amplifier included as part of the analog front end 104 and the cutoff frequency and boost of an analog filter included in the analog front end 104 are modifiable.

The analog front end 104 receives and processes the analog signal 106, and provides a processed analog signal 108 to an analog to digital converter (ADC) 110. In embodiments, the analog signal 106 is derived from a variety of sources. For example, in some embodiments, the analog signal 106 is derived from a read/write head assembly in a storage or transmission channel that is disposed in relation to a storage medium. In other embodiments, the analog signal 106 is derived from a receiver circuit in a storage or transmission channel that is operable to receive a signal from a transmission medium. In embodiments, the transmission medium is wireless or wired and includes, but is not necessarily limited to: cable or optical connectivity. Other examples are possible.

The analog to digital converter (ADC) 110 converts the processed analog signal 108 into a corresponding series of digital sample data 112 or X samples. The analog to digital converter (ADC) 110 comprises a circuit that is capable of producing digital sample data corresponding to a processed analog signal (analog input signal) 108. It will be appreciated that a variety of analog to digital converters (ADCs) 110 are employed by various embodiments of the data processing apparatus 100. It is further contemplated that, in some embodiments, the digital sample data (X samples) 112 is obtained directly from a digital storage device or digital transmission medium, without the use of an analog to digital converter (ADC) 110.

The digital sample data (X samples) 112 is provided to equalizers 114 of the data-dependent equalizer circuit 102. The equalizers 114 apply an equalization algorithm to the digital sample data (X samples) 112 to yield equalized sample data 116 or Y samples. In embodiments, the equalizers 114 comprise digital finite impulse response (DFIR) filter circuits. However, other embodiments are contemplated. In embodiments, the equalized digital sample data (Y samples) 116 are stored in a Y memory (not shown) until the data dependent equalizer circuit 102 (e.g., the detector 118 of the data dependent equalizer circuit 102) is available to begin processing the data 116 as discussed below.

The equalized digital sample data (Y samples) 116 is provided to noise prediction filters 120 of the data-dependent equalizer circuit 102. The noise prediction filters 120 are configured to filter noise in the equalized digital sample data (Y samples) 116 for at least one predetermined non-return to zero (NRZ) condition. The data-dependent equalizer circuit 102 employs a plurality of equalizers 114 that are communicatively coupled with (e.g., provide equalized digital sample data (Y samples) 116 to) a plurality of noise prediction filters 120 so that each equalizer 114 is coupled with one or more corresponding noise prediction filter 120.

Each equalizer 114 of the data-dependent equalizer circuit 102 is configured to yield equalized sample data that corresponds to the at least one predetermined NRZ condition for one or more of the noise prediction filters 120. Thus, a system 100 that employs a number (K) of noise prediction filters 120 also employs a number (N) of equalizers 114 equal to or less than the number (K) of noise prediction filters 120 (e.g., K≥N). Each of the equalizers 114 is particularly configured (e.g., designed and/or adapted) to generate equalized sample data for the one or more noise prediction filters 120 with which it is coupled, so that the noise level of the one or more noise prediction filters 120 is reduced. In this manner, the data dependent equalizer circuit 102 provides an equalization system that is more suitable for different NRZ (NPFIR) conditions, reducing the noise level at each noise prediction filter and improving the overall performance of the system. For example, in one embodiment, the data-dependent equalizer circuit 120 furnished greater than at least approximately 0.02 dB Bit Error Rate/Sector Failure Rate (BER/SFR) gain. Similarly, in another embodiment, the data-dependent equalizer circuit furnished greater than at least approximately 0.06 dB BER/SFR gain.

Figure 1B:
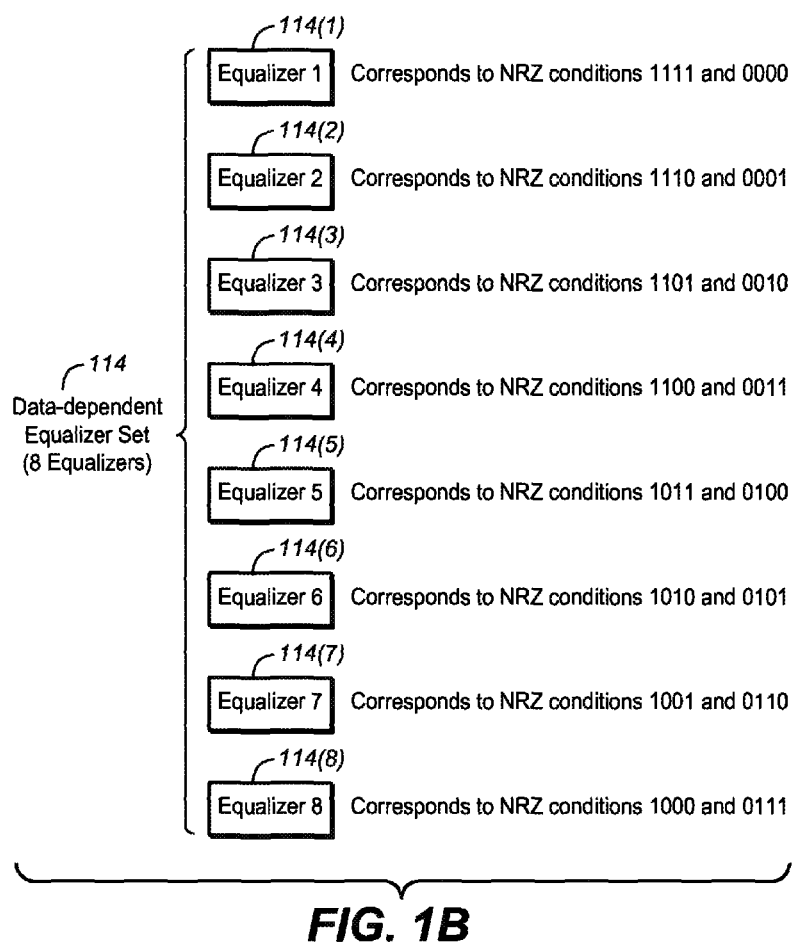
FIG. 1B is a block diagram that illustrates an example data-dependent equalizer set that employs eight (8) equalizers, wherein each equalizer is configured to yield equalized sample data that corresponds to the at least one predetermined non-return to zero (NRZ) condition.
Figure 1C:
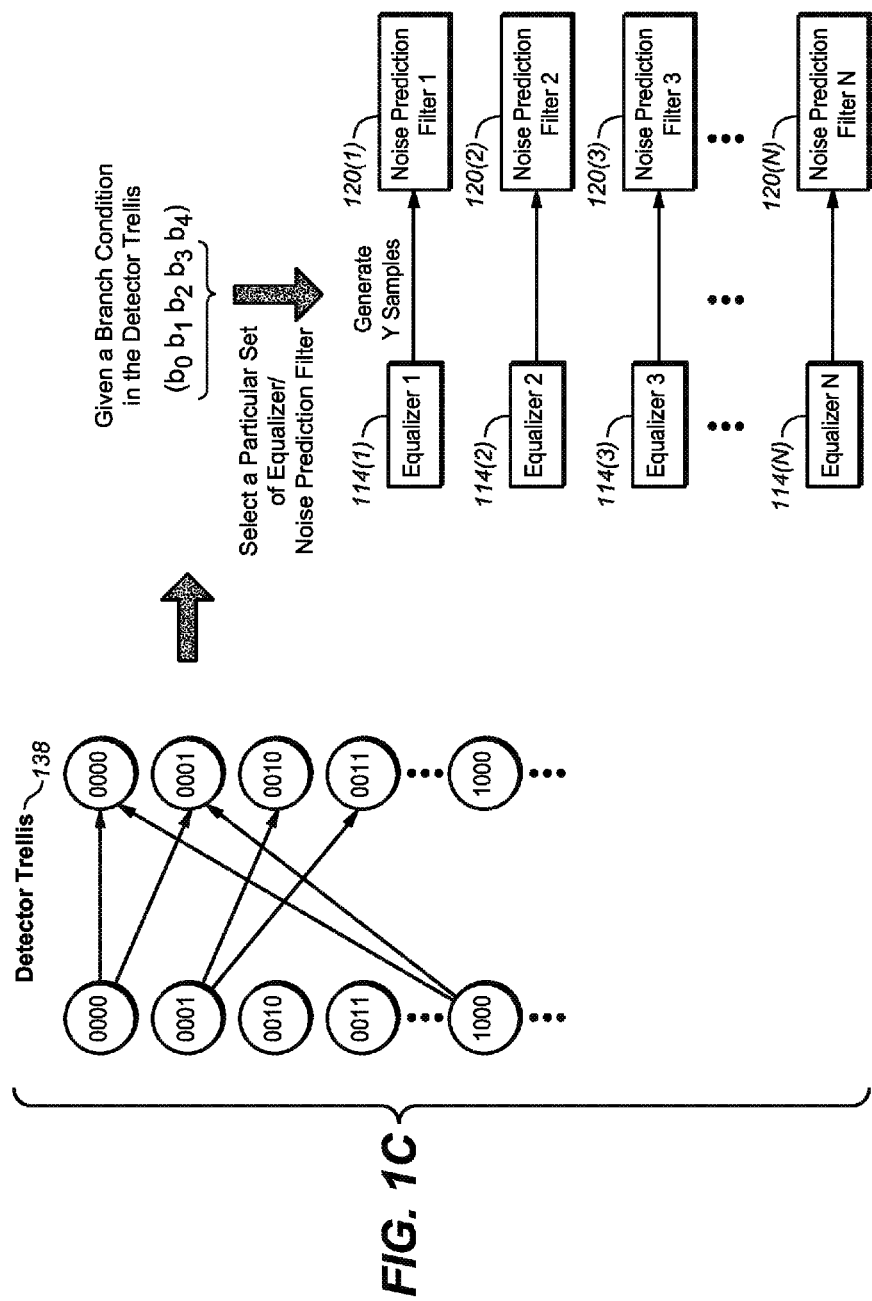
FIG. 1C is a block diagram that illustrates selection of a paired equalizer and noise prediction filter from a plurality of paired equalizers and noise prediction filters based on predetermined NRZ conditions.

In the embodiment illustrated in FIGS. 1A through 1C, the data-dependent equalizer circuit 102 employs a plurality of equalizers 114 that are communicatively coupled with (e.g., provide equalized digital sample data (Y samples) 116 to) an equal number of noise prediction filters 120 so that each equalizer 114 is paired with a corresponding noise prediction filter 120. Thus, a system that employs a number (K) of noise prediction filters also employs a number (N) of equalizers that is equal to the number (K) of noise prediction filters (K=N), where each of the equalizers is particularly configured (e.g., designed and/or adapted) to generate equalized sample data for the particular noise prediction filter with which it is paired, so that the noise level of the noise prediction filter is reduced. In this manner, the data dependent equalizer circuit 102 provides an equalization system that is more suitable for different NRZ (NPFIR) conditions, reducing the noise level at each noise prediction filter and improving the overall performance of the system.

Thus, in the embodiment shown in FIGS. 1A through 1C, the data-dependent equalizer circuit 102 is illustrated as including "Equalizer 1" 114(1), "Equalizer 2" 114(2), "Equalizer 3" 114(3), through "Equalizer N" 114(N), which are paired with (e.g., provide equalized digital sample data (Y samples) 116(1)-116(N) to) "Noise Prediction Filter 1" 120(1), "Noise Prediction Filter 2" 120(2), "Noise Prediction Filter 3" 120(3), through "Noise Prediction Filter N" 120(N), respectively. Thus, as illustrated, "Equalizer 1" 114(1) is paired with (e.g., provides equalized digital sample data (Y samples) 116(1) to) "Noise Prediction Filter 1" 120(1), "Equalizer 2" 114(2) is paired with (e.g., provides equalized digital sample data (Y samples) 116(2) to) "Noise Prediction Filter 2" 120(2), "Equalizer 3" 114(3) is paired with (e.g., provides equalized digital sample data (Y samples) 116 (3) to) "Noise Prediction Filter 3" 120(3), "Equalizer N" 114(N) is paired with (e.g., provides equalized digital sample data (Y samples) 116(N) to) "Noise Prediction Filter N" 120(N), and so forth.

In embodiments, the data-dependent equalizer circuit 102 employs eight (8) noise prediction filters 120, and thus includes eight (8) equalizers 114 paired with the noise prediction filters 120. In such embodiments, each of the equalizers is configured to furnish equalized digital sample data (Y samples) to a paired noise prediction filter 120 corresponding to the non-return to zero (NRZ) conditions of the paired filter 120.

For example, in the illustrated embodiments, "Noise Prediction Filter 1" 120(1) corresponds to (e.g., is configured to filter noise in sample data for) non-return to zero (NRZ) conditions 0000 and 1111; "Noise Prediction Filter 2" 120(2) corresponds to (e.g., is configured to filter noise in sample data for) non-return to zero (NRZ) conditions 0001 and 1110; "Noise Prediction Filter 3" 120(3) corresponds to (e.g., is configured to filter noise in sample data for) non-return to zero (NRZ) conditions 0010 and 1101; "Noise Prediction Filter 4" 120(4) corresponds to (e.g., is configured to filter noise in sample data for) non-return to zero (NRZ) conditions 0011 and 1100; "Noise Prediction Filter 5" 120(5) corresponds to (e.g., is configured to filter noise in sample data for) non-return to zero (NRZ) conditions 0100 and 1011; "Noise Prediction Filter 6" 120(6) corresponds to (e.g., is configured to filter noise in sample data for) non-return to zero (NRZ) conditions 0101 and 1010; "Noise Prediction Filter 7" 120(7) corresponds to (e.g., is configured to filter noise in sample data for) non-return to zero (NRZ) conditions 0110 and 1001; and "Noise Prediction Filter 8" 120(8) corresponds to (e.g., is configured to filter noise in sample data for) non-return to zero (NRZ) conditions 0111 and 1000.

Thus, as shown in FIG. 1B, "Equalizer 1" 114(1) is configured to yield equalized digital sample data (Y samples) that corresponds to the predetermined NRZ conditions 1111 and 0000 (e.g., "Noise Prediction Filter 1" 120(1)), "Equalizer 2" 114(2) is configured to yield equalized digital sample data (Y samples) that corresponds to the predetermined NRZ conditions 1110 and 0001 (e.g., "Noise Prediction Filter 2" 120 (2)), "Equalizer 3" 114(3) is configured to yield equalized digital sample data (Y samples) that corresponds to predetermined NRZ conditions 1101 and 0010 (e.g., "Noise Prediction Filter 3" 120(3)), "Equalizer 4" 114(4) is configured to yield equalized digital sample data (Y samples) that corresponds to the predetermined NRZ conditions 1100 and 0011

(e.g., "Noise Prediction Filter 4" 120(4)), "Equalizer 5" 114(5) is configured to yield equalized digital sample data (Y samples) that corresponds to the predetermined NRZ conditions 1011 and 0100 (e.g., "Noise Prediction Filter 5" 120(5)), "Equalizer 6" 114(6) is configured to yield equalized digital sample data (Y samples) that corresponds to the predetermined NRZ conditions 1010 and 0101 (e.g., "Noise Prediction Filter 6" 120(6)), "Equalizer 7" 114(7) is configured to yield equalized digital sample data (Y samples) that corresponds to the predetermined NRZ conditions 1001 and 0110 (e.g., "Noise Prediction Filter 7" 120(7)), and "Equalizer 8" 114(8) is configured to yield equalized digital sample data (Y samples) that corresponds to the predetermined NRZ conditions 1000 and 0111 (e.g., "Noise Prediction Filter 8" 120(8)).

However, in other embodiments, the data-dependent equalizer circuit 102 employs sixteen (16) noise prediction filters 120, and thus includes sixteen (16) equalizers 114 paired with the noise prediction filters 120. It is further contemplated that, in other embodiments, the data-dependent equalizer circuit 102 employs other numbers (e.g., 4, 32, 64, etc.) noise prediction filters 120 with a corresponding number of equalizers 114.

Figures 1, 1D, 2:
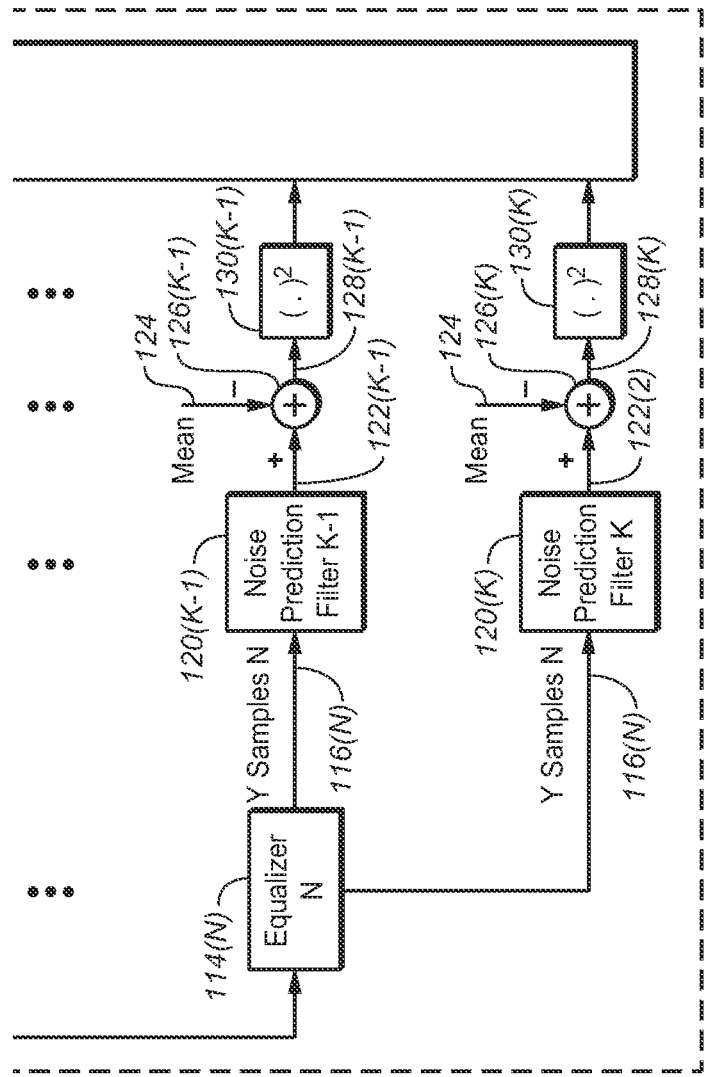
FIG. 1D is a block diagram that illustrates a data processing apparatus that employs a data-dependent equalizer circuit in accordance with another example embodiment of the disclosure.
FIG. 2 is a flow diagram that illustrates a method that is employed by the data-dependent equalizer circuit in an embodiment of the disclosure to yield equalized sample data that corresponds to the predetermined NRZ conditions of a noise prediction filter of the data-dependent equalizer circuit.
Figure 1E:
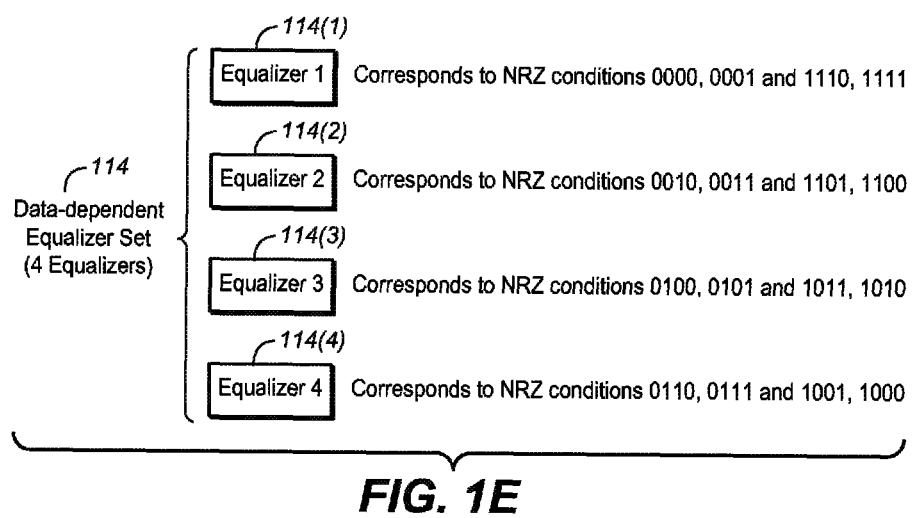
FIG. 1E is a block diagram that illustrates an example data-dependent equalizer set that employs four (4) equalizers, wherein each equalizer is configured to yield equalized sample data that corresponds to the at least one predetermined non-return to zero (NRZ) condition.
Figure 2:
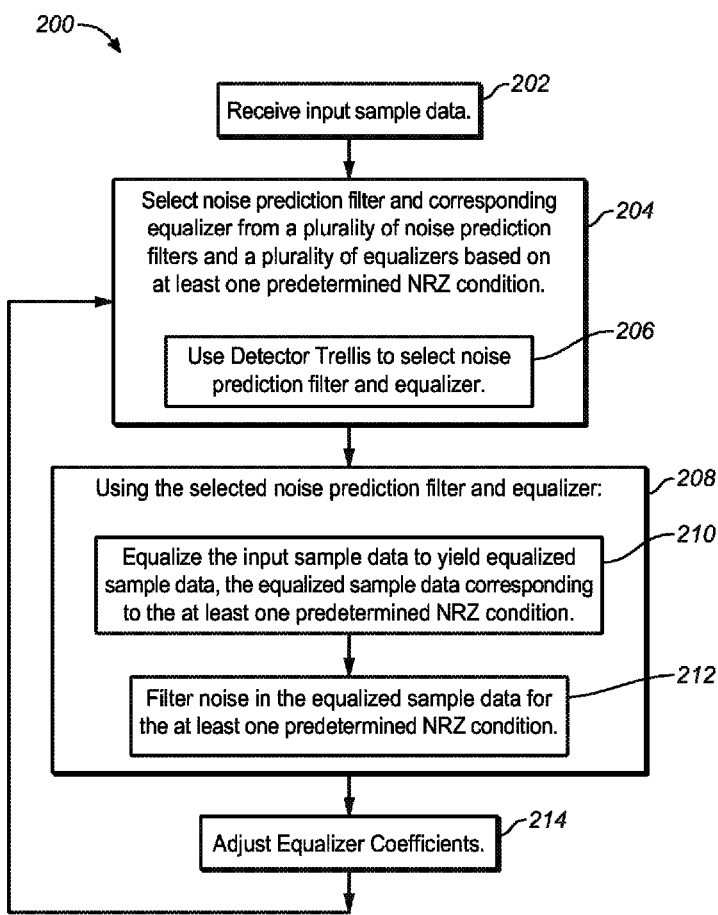

In the embodiment illustrated in FIGS. 1D through 1F, the data-dependent equalizer circuit 102 illustrated employs a plurality of equalizers 114 that are communicatively coupled with (e.g., provide equalized digital sample data (Y samples) 116 to) a plurality of noise prediction filters 120 so that each equalizer 114 is coupled with multiple (e.g., two, four, etc.) noise prediction filters 120. Thus, a system that employs a number (K) of noise prediction filters employs a lesser number (N) of equalizers, where each of the equalizers is particularly configured (e.g., designed and/or adapted) to generate equalized sample data for one or more particular noise prediction filters with which it is coupled, so that the noise level of the noise prediction filter is reduced. In this manner, the data dependent equalizer circuit provides an equalization system that is more suitable for different NRZ (NPFIR) conditions, reducing the noise level at each noise prediction filter and improving the overall performance of the system.

Thus, in the embodiment shown in FIGS. 1D through 1F, the data-dependent equalizer circuit 102 is illustrated as including "Equalizer 1" 114(1), "Equalizer 2" 114(2), through "Equalizer N" 114(N), which are coupled with (e.g., provide equalized digital sample data (Y samples) 116(1)-116(K) to) "Noise Prediction Filter 1" 120(1), "Noise Prediction Filter 2" 120(2), "Noise Prediction Filter 3" 120(3), "Noise Prediction Filter 4" 120(4), through "Noise Prediction Filter K−1" 120(K−1), and "Noise Prediction Filter K" 120(K), respectively, where the number (K) is larger than the number (N) (e.g., the number (K) is twice the number (N) (K=2N)). Thus, as illustrated, "Equalizer 1" 114(1) is coupled with (e.g., provides equalized digital sample data (Y samples) 116(1) to) "Noise Prediction Filter 1" 120(1) and Noise Prediction Filter 2" 120(2), "Equalizer 2" 114(2) is coupled with (e.g., provides equalized digital sample data (Y samples) 116(2) to) "Noise Prediction Filter 3" 120(3) and "Noise Prediction Filter 4" 120(4), "Equalizer N" 114(N) is paired with (e.g., provides equalized digital sample data (Y samples) 116(N) to) "Noise Prediction Filter K−1" 120(K−1) and "Noise Prediction Filter K" 120(K), and so forth.

In embodiments, the data-dependent equalizer circuit 102 employs eight (8) noise prediction filters 120, with four (4) equalizers 114, each coupled with two noise prediction filters 120. In such embodiments, each of the equalizers is configured to furnish equalized digital sample data (Y samples) to the noise prediction filters 120 corresponding to the non-return to zero (NRZ) conditions of the filters 120. For example, in the illustrated embodiments, "Noise Prediction Filter 1" 120(1) corresponds to (e.g., is configured to filter noise in sample data for non-return to zero (NRZ) conditions 0000 and 1111; "Noise Prediction Filter 2" 120(2) corresponds to (e.g., is configured to filter noise in sample data for non-return to zero (NRZ) conditions 0001 and 1110; "Noise Prediction Filter 3" 120(3) corresponds to (e.g., is configured to filter noise in sample data for non-return to zero (NRZ) conditions 0010 and 1101; "Noise Prediction Filter 4" 120(4) corresponds to (e.g., is configured to filter noise in sample data for non-return to zero (NRZ) conditions 0011 and 1100; "Noise Prediction Filter 5" 120(5) corresponds to (e.g., is configured to filter noise in sample data for non-return to zero (NRZ) conditions 0100 and 1011; "Noise Prediction Filter 6" 120(6) corresponds to (e.g., is configured to filter noise in sample data for non-return to zero (NRZ) conditions 0101 and 1010; "Noise Prediction Filter 7" 120(7) corresponds to (e.g., is configured to filter noise in sample data for non-return to zero (NRZ) conditions 0110 and 1001; and "Noise Prediction Filter 8" 120(8) corresponds to (e.g., is configured to filter noise in sample data for non-return to zero (NRZ) conditions 0111 and 1000.

Thus, as shown in FIG. 1E, "Equalizer 1" 114(1) is configured to yield equalized digital sample data (Y samples) that corresponds to the predetermined NRZ conditions 0000, 0001 and 1110, 1111 (e.g., "Noise Prediction Filter 1" 120(1) and "Noise Prediction Filter 2" 120(2)), "Equalizer 2" 114(2) is configured to yield equalized digital sample data (Y samples) that corresponds to the predetermined NRZ conditions 0010, 0011 and 1101, 1100 (e.g., "Noise Prediction Filter 3" 120(3) and "Noise Prediction Filter 4" 120(4)), "Equalizer 3" 114(3) is configured to yield equalized digital sample data (Y samples) that corresponds to predetermined NRZ conditions 0100, 0101 and 1011, 1010 (e.g., "Noise Prediction Filter 5" 120(5) and "Noise Prediction Filter 6" (120(6))), and "Equalizer 4" 114(4) is configured to yield equalized digital sample data (Y samples) that corresponds to the predetermined NRZ conditions 0110, 0111 and 1001, 1000 (e.g., "Noise Prediction Filter 7" 120(7) and "Noise Prediction Filter 8" 120(8)).

However, in other embodiments, the data-dependent equalizer circuit 102 employs sixteen (16) noise prediction filters 120, with eight (8) equalizers 114, each coupled with two noise prediction filters 120, sixteen (16) noise prediction filters 120, with four (4) equalizers 114, each coupled with four (4) noise prediction filters 120, and so forth. It is further contemplated that, in embodiments, the data-dependent equalizer circuit 102 employs other numbers (e.g., 4, 32, 64, etc.) noise prediction filters 120 and/or equalizers 114.

The filtered equalized digital sample data 122 from each noise prediction filter 120 (e.g., filtered equalized digital sample data 122(1)-122(N) as shown in FIG. 1A or filtered equalized digital sample data 122(1)-122(K) as shown in FIG. 1F) is compared with idealized equalized sample data 124. The idealized equalized sample data 124 is subtracted from the filtered equalized digital sample data 122 (e.g., filtered equalized digital sample data 122(1)-122(N) in FIG. 1A and 122(1)-122(K) in FIG. 1D), from each noise prediction filter 120 by adders 126 (e.g., adders 126(1)-126(N) in FIG. 1A and 126(1)-126(K) in FIG. 1D), respectively, and the difference averaged over time to yield a mean error 128 (e.g., mean error 128(1)-128(N) in FIGS. 1A and 128(1)-128(K) in FIG. 1B, which is squared by squarers 130 (e.g., squarers 130(1)-130(N in FIG. 1A and 130(1)-130(K) in FIG. 1D) to yield a mean squared error (MSE) 132 (e.g., mean squared error (MSE) 132(1)-132(N) in FIG. 1A and 132(1)-132(K) in FIG. 1D) for the digital sample data 122, which is used by the detector 118 to determine equalizer coefficients (e.g., DFIR tap coefficients) for the corresponding equalizers 114.

The detector 118 is operable to perform a data detection process on the filtered equalized sample data 122. For example, in embodiments, the detector 118 is configured to apply a data detection algorithm to the mean square error (MSE) 132 for the digital sample data 122. In embodiments, detector 118 comprises a Viterbi algorithm data detector circuit, such as a Soft-Output Viterbi (SOVA) algorithm data detector circuit. However, it is contemplated that, in other embodiments, the Viterbi algorithm data detector circuit comprises other Viterbi detection algorithms or Viterbi algorithm detector circuits or variations thereof including, but not limited to: bi-direction Viterbi detection algorithms or bi-direction Viterbi algorithm detector circuits. In other embodiments, the detector 118 comprises a maximum a posteriori (MAP) data detector circuit. Again, it is contemplated that, in other embodiments, the maximum a posteriori (MAP) data detector circuit comprises other maximum a posteriori (MAP) detection algorithm or detector circuit or variations thereof including, but not limited to: simplified maximum a posteriori (MAP) data detection algorithms and max-log maximum a posteriori (MAP) data detection algorithms, or corresponding detector circuits.

Upon completion, the detector 118 provides detected output 134. The detected output 134 includes soft data. Herein, the term "soft data" is used in its broadest sense to mean reliability data with each occurrence of the reliability data indicating likelihood that a corresponding bit position or group of bit positions has been correctly detected. In some embodiments, the soft data or reliability data includes log likelihood ratio data. The detected output 134 is provided to a decoder 136 for decoding. The decoder 136 applies a data decode algorithm to the detected output 134. In embodiments, the decoder 136 comprises any type of decoder circuit including binary and non-binary, layered and non-layered. In embodiments, the decoder is a low density parity check (LDPC) decoder circuit. In some embodiments, the detected output 134 is also interleaved in a local interleaver circuit (not shown) to shuffle sub-portions (i.e., local chunks) of the data set included as detector output 134, and stored in a central memory (not shown).

The data-dependent equalizer circuit 102 is applicable to storage of information on virtually any media and/or transmission of information over virtually any channel. Storage applications include, but are not limited to: hard disk drives, compact disks, digital video disks, magnetic tapes and memory devices such as DRAM, NAND flash, NOR flash, other non-volatile memories, and solid state drives. Transmission applications include, but are not limited to: optical fiber, radio frequency channels, wired or wireless local area networks, digital subscriber line technologies, wireless cellular, Ethernet over any medium such as copper or optical fiber, cable channels such as cable television, and Earth-satellite communications. Moreover, as utilized herein, an NRZ condition comprises an NRZ condition or any predetermined condition that is used as an equivalent to an NRZ condition, such as a non-return to zero, inverted (NRZI) condition, and so forth.

FIG. 2 illustrates a procedure (e.g., method, process) 200 in an embodiment of the disclosure that is employed by a data-dependent equalizer circuit, such as the data-dependent equalizer circuits 102 of FIGS. 1A through 1F, to yield equalized sample data that corresponds to the predetermined NRZ conditions of a noise prediction filter of the data-dependent equalizer circuit 102. As shown, input sample data is received (Block 202). For example, in embodiments, digital sample data (X samples) 112 is provided to equalizers 114 of the data-dependent equalizer circuit 102 (e.g., by an analog to digital converter (ADC) 110). However, it is contemplated that, in some embodiments, the digital sample data (X samples) 112 is obtained directly from a digital storage device or digital transmission medium, without the use of an analog to digital converter (ADC) 110.

A noise prediction filter and corresponding equalizer are selected from a plurality of noise prediction filters and a plurality of equalizers based on at least one predetermined non-return to zero (NRZ) condition (Block 204). For example, in one embodiment, shown in FIG. 1A, the data-dependent equalizer circuit 102 employs a plurality of equalizers 114 that are communicatively coupled with (e.g., provide input to) a plurality of noise prediction filters 120 so that each equalizer 114 is paired with a corresponding noise prediction filter 120. Similarly, in another embodiment, shown in FIG. 1D, the data-dependent equalizer circuit 102 employs a plurality of equalizers 114 that are communicatively coupled with (e.g., provide equalized digital sample data (Y samples) 116 to) a plurality of noise prediction filters 120 so that each equalizer 114 is coupled with multiple (e.g., two, four, etc.) noise prediction filters 120.

In embodiments, a detector trellis is used to select the noise prediction filter and equalizer (Block 206). For example, as shown in FIG. 1C, the detector 132 (FIG. 1A) employs a detector trellis 138 to select a particular paired equalizer 114 and noise prediction filter 120 for a given branch condition (NRZ condition) in the detector trellis 138. Similarly, as shown in FIG. 1F, the detector 118 (FIG. 1D) employs a detector trellis 138 to select a particular noise prediction filter 120 along with a corresponding equalizer for that filter 120 for a given branch condition (NRZ condition) in the detector trellis 138.

Using the selected noise prediction filter and corresponding equalizer (Block 208), the input sample data is equalized to yield equalized sample data corresponding to the predetermined NRZ conditions (Block 210) of the noise prediction filter. For example, each equalizer 114 of the data-dependent equalizer circuit 102 applies an equalization algorithm to the digital sample data (X samples) 112 to yield equalized sample data (Y samples) 116. The equalized sample data is then filtered to remove noise for the predetermined NRZ conditions (Block 212). For example, as shown in FIGS. 1C and 1F, the equalized digital sample data (Y samples) 116 from each equalizer 114 is provided to a corresponding noise prediction filter 120 of the data-dependent equalizer circuit 102, which is configured to filter noise in the equalized digital sample data (Y samples) 116 for the predetermined NRZ conditions.

The equalizer coefficients (e.g., DFIR tap coefficients) for the selected equalizer is then adjusted (Block 214). As noted, the filtered equalized sample data is provided to a detector such as a soft output Viterbi (SOVA) detector, a maximum a posteriori (MAP) detector, and so forth, that performs a data detection process on the data. For example, as shown in FIGS. 1A and 1D, the filtered equalized digital sample data 122 from each noise prediction filter 120 (e.g., filtered equalized digital sample data 122(1)-122(N) as shown in FIG. 1A or filtered equalized digital sample data 122(1)-122(K) as shown in FIG. 1F) is then compared with idealized equalized sample data 124. The idealized equalized sample data 124 is subtracted from the filtered equalized digital sample data 122 (e.g., filtered equalized digital sample data 122(1)-122(N) in FIG. 1A and 122(1)-122(K) in FIG. 1D), from each noise prediction filter 120 by adders 126 (e.g., adders 126(1)-126(N) in FIG. 1A and 126(1)-126(K) in FIG. 1D), respectively, and the difference averaged over time to yield a mean error 128 (e.g., mean error 128(1)-128(N) in FIG. 1A and 128(1)-128(K) in FIG. 1B), which is squared by squarers 130 (e.g., squarers 130(1)-130(N) in FIG. 1A and 130(1)-130(K) in FIG. 1D) to yield a mean squared error (MSE) 132 (e.g., mean squared error (MSE) 132(1)-132(N) in FIG. 1A and 132(1)-132(K) in FIG. 1D) for the digital sample data 122, which is used by the detector 118 to determine equalizer coefficients (e.g., DFIR tap coefficients) for the corresponding equalizers 114.

The equalizer coefficients are configured (e.g., selected or calculated) to reduce a mean squared error of the noise in sample data yielded by the paired equalizer 114 and noise prediction filter 120. For example, the mean square error ($\eta$) of the noise in sample data yielded by the paired equalizer and noise prediction filter 120 is represented by the equation:

$$\eta = \left( \sum_{m=0}^{3} \left( \sum_{j=0}^{15} x[k+s-m-j] a_{cond,j} - \hat{y}[k-m] \right) f[cond][m] \right)^2 \quad \text{EQN. 1}$$

wherein x[k] is the digital sample data (X samples) 112 from the analog to digital converter (ADC) 104 and ŷ[k] is the ideal equalized sample at time k; f[cond][m], where m=0, 1, 2, 3 are noise prediction filter (NPFIR) coefficients, assuming a four (4) tap noise prediction filter (NPFIR) 120; $a_j$ are the equalizer coefficients, where j=0, 1, 2, . . . , 15, assuming a sixteen (16) tap equalizer (DFIR) 114, s is the equalizer main-tap position. The equalizer coefficients $a_j$ are dependent on the NRZ (NPFIR) condition (e.g., $a_{cond,j}$). The equalizer coefficients $a_{cond,j}$ and noise prediction filter (NPFIR) coefficients f[cond][m] is determined using the least mean square (LMS) algorithm:

$$\frac{\partial \eta}{\partial a_{cond,n}} = \quad \text{EQN. 2}$$
$$2 \left( \sum_{m=0}^{3} e[k-m] f[cond][m] \right) \left( \sum_{m=0}^{3} x[k+s-m-n] f[cond][m] \right)$$

$$\frac{\partial \eta}{\partial f[cond][m]} = 2 \left( \sum_{m=0}^{3} e[k-m] f[cond][m] \right) \quad \text{EQN. 3}$$
$$\left( \sum_{j=0}^{9} x[k+s-m-j] a_{cond,j} - \hat{y}[k-m] \right)$$

Equations 1-3 represent one possible way to adapt the equalizer coefficients (DFIR tap coefficients) of the data-dependent equalizers 114, and it is contemplated that other methods are used to furnish equalizer adaptation.

Figure 3:
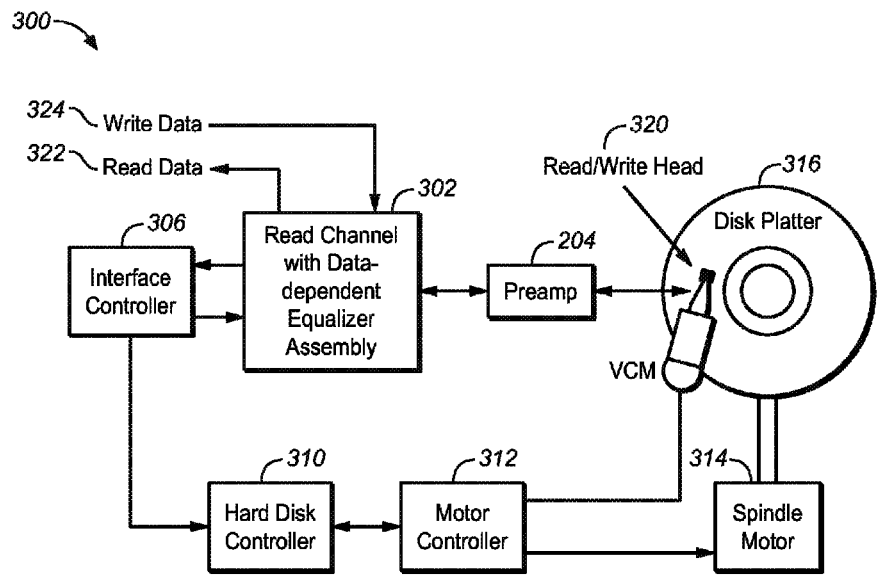
FIG. 3 is a block diagram that illustrates a storage system having a read channel that employs a data-dependent equalizer circuit, such as the data-dependent equalizer circuit shown in FIGS. 1A through 1C, in accordance with an embodiment of the disclosure.
Figure 4:
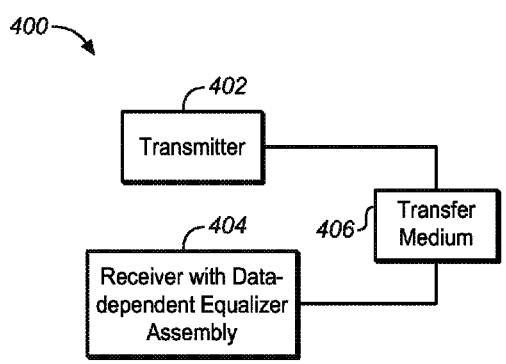
FIG. 4 is a block diagram that illustrates a wireless communication system having a receiver that employs a data-dependent equalizer circuit, such as the data-dependent equalizer circuit shown in FIGS. 1A through 1C, in accordance with an embodiment of the disclosure.

Although the data-dependent equalizer circuit disclosed herein is not limited to any particular application, several examples of applications are presented in FIGS. 3 and 4. In FIG. 3, a storage system 300 is illustrated. The storage system 300 includes a read channel circuit 302 that employs a data-dependent equalizer circuit in accordance with an embodiment of the disclosure, such as the data-dependent equalizer circuit 102 shown in FIGS. 1A through 1C. The storage system 300 is, for example, a hard disk drive (HDD). As shown, the storage system 300 includes a preamplifier 304, an interface controller 306, a hard disk controller 310, a motor controller 312, a spindle motor 314, a disk platter 316, and a read/write head assembly 320. The interface controller 306 controls addressing and timing of data to/from the disk platter 316. The data on the disk platter 316 includes groups of magnetic signals that are detected by the read/write head assembly 320 when the assembly is properly positioned over disk platter 316. In one or more embodiments, the disk platter 316 includes magnetic signals recorded in accordance with either a longitudinal or a perpendicular recording scheme.

In a typical read operation, the read/write head assembly 320 is accurately positioned by the motor controller 312 over a desired data track on the disk platter 316. The motor controller 312 positions the read/write head assembly 320 in relation to the disk platter 316 and drives the spindle motor 314 by moving the read/write head assembly 320 to the proper data track on the disk platter 316 under the direction of the hard disk controller 310. The spindle motor 314 spins the disk platter 316 at a determined spin rate (e.g., at a determined number of revolutions per minute (RPM)). Once the read/write head assembly 320 is positioned adjacent the proper data track, magnetic signals representing data on the disk platter 316 are sensed by the read/write head assembly 320 as the disk platter 316 is rotated by the spindle motor 314. The sensed magnetic signals are provided as a continuous, minute analog signal representative of the magnetic data on the disk platter 316. This minute analog signal is transferred from the read/write head assembly 320 to the read channel circuit 302 via a preamplifier 304. The preamplifier 304 is operable to amplify the minute analog signals accessed from the disk platter 316. In turn, the read channel 302 decodes and digitizes the received analog signal to recreate the information originally written to the disk platter 316. This data is provided as read data 322 to a receiving circuit. As part of decoding the received information, the read channel 302 processes the received signal using the data-dependent equalizer circuit 102 as described herein. A write operation is substantially the opposite of the preceding read operation with write data 324 being provided to the read channel 302. This data is then encoded and written to the disk platter 316.

It should be noted that, in embodiments, the storage system 300 is integrated into a larger storage system such as, for example, a RAID (redundant array of inexpensive disks or redundant array of independent disks) based storage system. RAID storage systems increase stability and reliability through redundancy, combining multiple disks as a logical unit. In this manner, data is spread across a number of disks included in the RAID storage system according to a variety of algorithms and accessed by an operating system as if the RAID storage system were a single disk drive. For example, in embodiments, data is mirrored to multiple disks in the RAID storage system. In other embodiments, data is sliced and distributed across multiple disks using a number of techniques. If a small number of disks in the RAID storage system fail or become unavailable, error correction techniques are used to recreate the missing data based on the remaining portions of the data from the other disks in the RAID storage system. The disks in the RAID storage system include, but are not limited to: individual storage systems such as storage system 300, and are located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk drive.

FIG. 4 illustrates a wireless communication system 400 or data transmission device including a receiver 404 that employs a data-dependent equalizer circuit in accordance with an embodiment of the disclosure, such as the data-dependent equalizer circuit 102 shown in FIGS. 1A through 1C. The communication system 400 includes a transmitter 402 that is operable to transmit encoded information via a transfer medium 406. The encoded data is received from the transfer medium 406 by receiver 404. As part of the processing of the encoded data, the receiver 404 processes the received signal using a data-dependent equalizer circuit 102 as described herein.

Generally, any of the functions described herein can be implemented using hardware (e.g., fixed logic circuitry such as integrated circuits), software, firmware, manual processing, or a combination of these embodiments. Thus, the blocks discussed in the above disclosure generally represent hardware (e.g., fixed logic circuitry such as integrated circuits), software, firmware, or a combination thereof. In the case of a hardware embodiment, for example, the various blocks discussed in the above disclosure are implemented as integrated circuits along with other functionality. Such integrated circuits include all of the functions of a given block, system or circuit, or a portion of the functions of the block, system or circuit. Further, elements of the blocks, systems or circuits can be implemented across multiple integrated circuits. Such integrated circuits can be any type of integrated circuit including, but not necessarily limited to, a monolithic integrated circuit, a flip chip integrated circuit, a multichip module integrated circuit, and/or a mixed signal integrated circuit. In the case of a software embodiment, for example, the various blocks discussed in the above disclosure represent executable instructions (e.g., program code) that perform specified tasks when executed on a processor. In embodiments, these executable instructions are stored in one or more tangible computer readable media. In some such embodiments, the entire system, block or circuit is implemented using its software or firmware equivalent. In other embodiments, one part of a given system, block or circuit is implemented in software or firmware, while other parts are implemented in hardware.

Although the subject matter has been described in language specific to structural features and/or methodological acts, it is to be understood that the subject matter defined in the appended claims is not necessarily limited to the specific features or acts described. Although various configurations are discussed the apparatus, systems, subsystems, components and so forth can be constructed in a variety of ways without departing from this disclosure. Rather, the specific features and acts are disclosed as example forms of implementing the claims.

What is claimed is:

1. A data processing apparatus, comprising:
   a plurality of noise prediction filters each communicatively coupled to a respective one of a plurality of equalizers making a plurality of paired noise prediction filters and equalizers, wherein each of the noise prediction filters is configured to filter noise in sample data for a respective predetermined non-return to zero (NRZ) condition, and wherein each of the plurality of equalizers is configured to yield a respective equalized sample data that corresponds to respective one of the plurality of paired noise prediction filters and equalizers; and
   a detector operable to:
      select one of the equalized sample data from a respective one of the plurality of paired noise prediction filters and equalizers as a selected detector input; and
      perform a data detection process on the selected detector input.

2. The data processing apparatus as recited in claim 1, wherein the detector comprises a soft output Viterbi (S OVA) detector.

3. The data processing apparatus as recited in claim 1, wherein the detector comprises a maximum a posteriori (MAP) detector.

4. The data processing apparatus as recited in claim 1, wherein the noise prediction filter comprises a noise prediction finite impulse response (NPFIR) filter.

5. The data processing apparatus as recited in claim 1, wherein the at least one equalizer comprises equalizer coefficients, the equalizer coefficients configured to iteratively determine a mean squared error of the noise in sample data yielded by the one or more noise prediction filters.

6. The data processing apparatus of claim 1, wherein the detector comprises a detector trellis, and wherein selecting the one of the equalized sample data from the respective one of the plurality of paired noise prediction filters and equalizers as a selected detector input is selected based on a branch condition in a detector trellis.

7. A method comprising:
   receiving input sample data;
   providing a plurality of combination circuits each including a noise prediction filter and a corresponding equalizer;
   selecting one of the plurality of combination circuits based on a respective non-return to zero (NRZ) condition from a detector; and
   using the selected one of the plurality of combination circuits to equalize the input sample data to yield equalized sample data, the equalized sample data corresponding to the respective non-return to zero (NRZ) condition; and
   filtering noise in the equalized sample data for the respective non-return to zero (NRZ) condition.

8. The method as recited in claim 7, further comprising providing the filtered equalized sample data to the detector, and performing a data detection process on the filtered equalized sample data via the detector.

9. The method as recited in claim 8, wherein the detector comprises a detector trellis, and wherein the one of the plurality of combination circuits is selected based on a branch condition in the detector trellis.

10. The method as recited in claim 8, wherein the detector comprises a soft output Viterbi (SOVA) detector.

11. The method as recited in claim 8, wherein the detector comprises a maximum a posteriori (MAP) detector.

12. The method as recited in claim 7, wherein at least one equalizer included in the plurality of combination circuits comprises equalizer coefficients, the equalizer coefficients configured to determine a mean squared error of the noise in sample data yielded by the corresponding one or more noise prediction filters.

13. The method of claim 7, wherein the noise prediction filters are finite impulse response (NPFIR) filters.

14. A storage system, comprising:
   a storage medium configured to maintain a data set;
   a read/write assembly operable to read the data set on the storage medium; and
   a data processing apparatus operable to correct errors in the data set read from the storage medium, comprising:
      a first noise prediction filter configured to filter noise in sample data for a first predetermined non-return to zero (NRZ) condition;
      a second noise prediction filter configured to filter noise in the sample data for a second predetermined non-return to zero (NRZ) condition, the second predetermined non-return to zero (NRZ) condition different from the first predetermined non-return to zero (NRZ) condition;

a first equalizer communicatively coupled to the first noise prediction filter, the first equalizer configured to yield equalized sample data corresponding to the first predetermined non-return to zero (NRZ) condition;

a second equalizer communicatively coupled to the second noise prediction filter, the second equalizer configured to yield equalized sample data corresponding to the second predetermined non-return to zero (NRZ) condition; and a detector configured to receive the equalized sample data from the plurality of first noise prediction filters and the second noise prediction filter, the detector operable to:

select one of the equalized sample data from a respective one of the plurality of first noise prediction filters and the second noise prediction filter as a selected detector input; and perform a data detection process on the selected detector input, wherein the detector comprises a detector trellis, and wherein the detector is configured to cause a paired noise prediction filter and equalizer to be selected to yield the selected detector input based on a branch condition in the detector trellis.

15. The storage system as recited in claim 14, wherein the detector comprises a soft output Viterbi (SOVA) detector.

16. The storage system as recited in claim 14, wherein the detector comprises a maximum a posteriori (MAP) detector.

17. The storage system as recited in claim 14, wherein the noise prediction filters comprise noise prediction finite impulse response (NPFIR) filters.

18. The storage system as recited in claim 14, wherein at least one of the first equalizer or the second equalizer comprises equalizer coefficients, the equalizer coefficients iteratively configured to determine a mean squared error of the noise in sample data yielded by the corresponding one or more noise prediction filters.

* * * * *